UNITED STATES PATENT OFFICE.

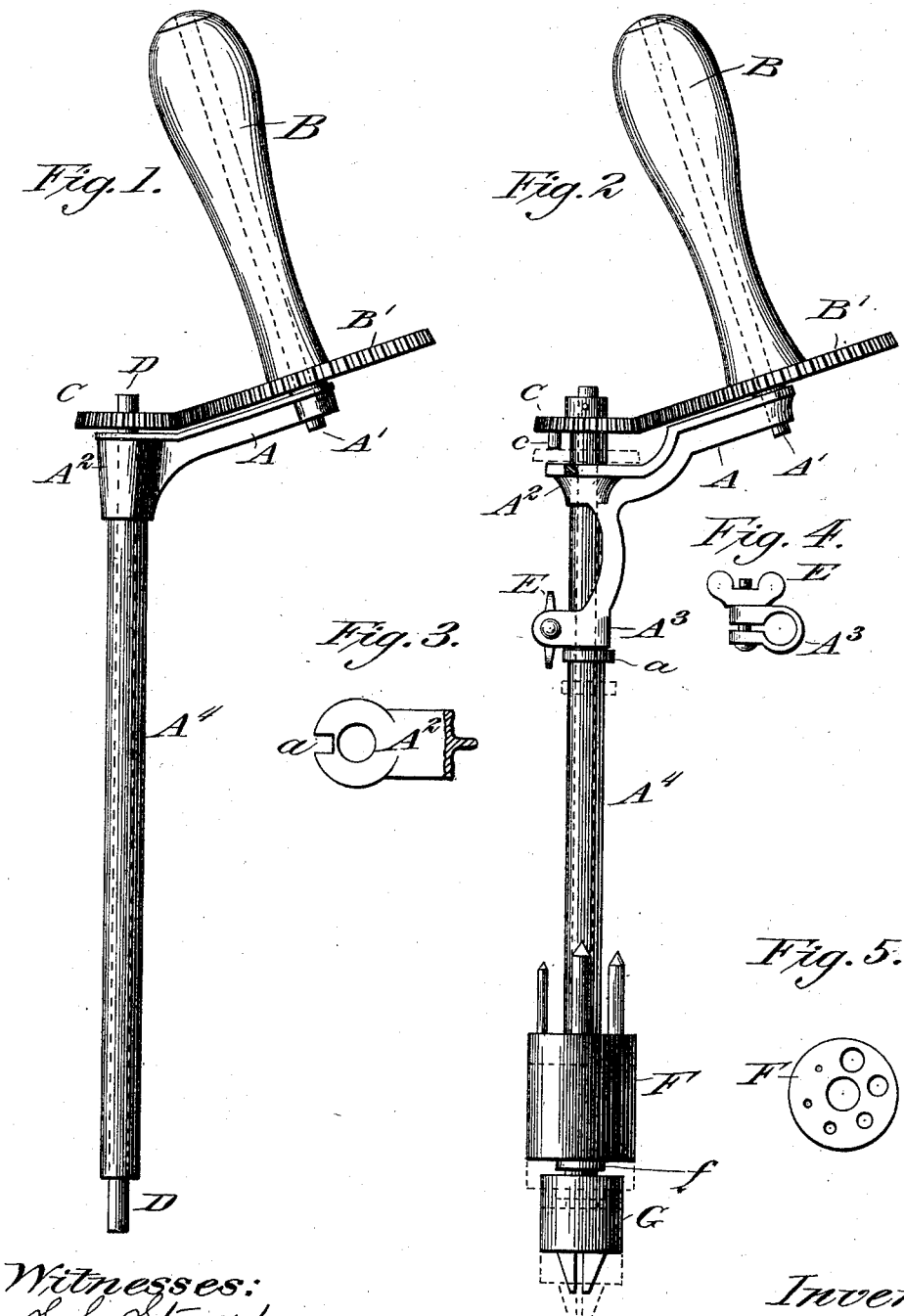

JOHN F. STEWARD, OF CHICAGO, ILLINOIS.

HAND-DRILL.

SPECIFICATION forming part of Letters Patent No. 448,689, dated March 24, 1891.

Application filed June 4, 1890. Serial No. 354,300. (No model.)

*To all whom it may concern:*

Be it known that I, JOHN F. STEWARD, of Chicago, in the county of Cook and State of Illinois, have invented certain new and useful Improvements in Hand-Drills, of which the following is a full specification, reference being had to the accompanying drawings.

Figure 1 illustrates my invention in its simplest form. In Fig. 2 it is shown in a more complicated and efficient form and with several improvements added. Figs. 3, 4, and 5 show details of construction.

A is a crank having a wrist A′ diagonal to the axis of rotation of the crank, and having an anti-friction sleeve B. The crank is mounted upon a shaft and is turned by a swinging rotary motion of the wrist of the operator. I prefer to elongate the hub $A^2$ of the crank, so that it may form a good journal-bearing for the drill-shaft D. In Fig. 2 I have shown the hub so extended by means of a tube $A^4$. The tube may rotate in the hub or not; but I prefer to have it capable of a longitudinal movement for reasons which I will fully explain. In Fig. 2 the casting which forms the arm of the crank and the hub is extended downward and terminates in a split collar. The tube $A^4$ passes up through this and through the eye of the hub proper $A^2$ and is free to slide, unless the pinch-bolt operated by the thumb-nut E be turned to close the split collar so tightly thereon as to prevent sliding action. I provide for this sliding action as one of many means for the purpose of changing the rapidity of rotation of the drill-shaft. As one piece with the handle B is the gear B′ and secured to the shaft D is the pinion C. If the sleeve or handle B be held tightly in the hand and the crank rotated, the intermeshing of the gears will cause the drill-shaft to revolve rapidly. With a pinion one inch in diameter and the gear three the shaft will be given four revolutions to every rotation of the crank. Upon the under side of the pinion I form a pin $c$ and cut a notch $a$ in the hub $A^2$. The sleeve $A^4$ may be slid downward, carrying the shaft journaled in it therewith, so as to pass the pin $c$ of the pinion secured to the shaft into the notch $a$, and then the shaft will be locked to the crank, and one rotation of the crank will revolve the drill but once.

If provision were not made for disengaging the gears, the sleeve B would have to rotate in the hand, and hence cause unnecessary friction. For this reason I provide means for throwing the parts out of gear when the drill-shaft is locked to the crank through the instrumentality of the pin on the pinion or otherwise. By choosing the longitudinal movement of the shaft as means for locking it from rotation at any speed different from that of the crank I am enabled to disengage the gears without special appliances. If preferred, any kind of unclutching device may be substituted. Tightening of the thumb-nut will hold the parts to any position to which the shaft and tube may be slid.

In Fig. 2 the pinion is shown in dotted lines out of mesh and locked to the crank.

I wish to be understood as not limiting my claims to the precise form of engaging and disengaging device shown, but shall consider any known form of clutching and unclutching, engaging, or disengaging device to be the equivalent thereof.

I do not limit myself to the means for controlling the sliding action of the shaft nor to the pinch-screw E for preventing the sliding movement of the sleeve, nor do I limit myself to anything for the purpose, because after the operator has become familiar with the tool the tube and crank need not be locked together.

F is a block of wood or other suitable material fitted loosely upon the sleeve or upon the shaft if no sleeve is used; or if the tube is not the full length of the shaft it may be provided with a wearing-plate $f$. I make it serve as a receptacle for tools; but its most important use is to control, or at least make it possible to control, the rate of speed of the drill as compared with that of the crank. The pinch-screw may be left loose and the shaft left free to slide. If no sleeve is used, the collar $a$, which is shown thereon, should be upon the shaft itself.

With a large drill or bit in the chuck G it is necessary to use the slow speed, and to do so the operator must press the sleeve F and force the tool to its work, and at the same time while turning draw the crank slightly upward, causing the pinion to lock with the crank. If he wishes to increase the speed, he simply presses downward upon the crank while turning it and relieves the pressure upon the tool through the sleeve F.

What I claim is—

1. The crank having the diagonal twist, the sleeve upon the wrist thereof and having the gear B′ secured thereto, and the shaft D, having the pinion C, all combined substantially as described.

2. The crank, the sleeve upon the wrist thereof and having the gear B′ secured thereto, and the shaft having the pinion C and adapted by a sliding movement to lock to the said crank, all combined substantially as described.

3. The crank, the sleeve upon the wrist thereof and having the gear B′ secured thereto, and the shaft having the pinion adapted by a sliding movement to be thrown into mesh with the gear and also to lock to the crank at will, all combined substantially as described.

4. In a hand-drill, the combination of the crank having the diagonal wrist and forming a journal-bearing for the shaft D, and the handle B, the said handle permitted to rotate thereon, the said shaft and handle connected by gearing, whereby the orbital movement of said sleeve or handle produces rotation of the shaft, substantially as described.

5. The crank A, the handle B, tube $A^4$, shaft D, and gearing connecting the said shaft and handle, all combined substantially as described.

6. The crank A, the tube $A^4$, adapted to slide relative thereto, the shaft journaled in said tube, and mechanism, substantially as described, for securing said tube in its positions of adjustment, substantially as set forth.

7. The combination of the crank, the longitudinally-movable shaft, the sleeve B of said crank connected to said shaft by suitable gearing, and the sleeve F, substantially as described.

8. The combination, with the drill-stock, of the sleeve F as a tool-holder, substantially as described.

JOHN F. STEWARD.

Witnesses:
WINIFRED STEWARD,
SARA L. STEWARD.

It is hereby certified that in Letters Patent No. 448,689, granted March 24, 1891, upon the application of John F. Steward, of Chicago, Illinois, for an improvement in "Hand-Drills," an error appears in the printed specification requiring the following correction, viz.: In line 5, page 2, the word "twist" should read *wrist;* and that the said Letters Patent should be read with this correction therein that the same may conform to the record of the case in the Patent Office.

Signed, countersigned, and sealed this 7th day of April, A. D. 1891.

[SEAL.]

CYRUS BUSSEY,
*Assistant Secretary of the Interior.*

Countersigned:
 C. E. MITCHELL,
  *Commissioner of Patents.*